(12) United States Patent
Lanzo et al.

(10) Patent No.: US 7,592,838 B2
(45) Date of Patent: Sep. 22, 2009

(54) METHOD FOR COMMUNICATING DATA AND CLOCK SIGNALS AND CORRESPONDING SIGNAL, TRANSMITTER AND RECEIVER

(75) Inventors: Roberto Lanzo, Catania (IT); Marco Martini, Acireale (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 0 days.

(21) Appl. No.: 12/036,753

(22) Filed: Feb. 25, 2008

(65) Prior Publication Data

US 2008/0219358 A1      Sep. 11, 2008

(30) Foreign Application Priority Data

Mar. 6, 2007    (IT)    .......................... TO2007A0172

(51) Int. Cl.
*H03K 19/00*   (2006.01)
(52) U.S. Cl. .......................................... 326/82; 326/59
(58) Field of Classification Search .................. 326/59, 326/60, 82–86
See application file for complete search history.

(56) References Cited

U.S. PATENT DOCUMENTS

| 5,084,841 | A | 1/1992 | Williams et al. |
| 5,345,419 | A | 9/1994 | Fenstermaker et al. |
| 5,491,659 | A | 2/1996 | Howarter et al. |
| 6,263,410 | B1 | 7/2001 | Kao et al. |
| 6,477,205 | B1 * | 11/2002 | Doblar et al. ................ 375/259 |
| 6,857,043 | B1 | 2/2005 | Lee et al. |

OTHER PUBLICATIONS

Maxim Integrated Products, Inc.; "MAX9223/MAX9224—22-Bit, Low-Power, 5MHz to 10MHz Serializer and Deserializer Chipsets"; Oct. 2005; 19-3861; Rev 0; Sunnyvale, CA US.
EPO Search Report; EPO Patent Application No. 06116947.0; May 23, 2007.

* cited by examiner

*Primary Examiner*—Don P Le
(74) *Attorney, Agent, or Firm*—Hogan & Hartson LLP

(57) ABSTRACT

A clock signal constituted by pulses with given frequency of repetition and a data signal is able to assume two logic levels are transmitted simultaneously on a two-wire line in the form of a bipolar differential pulse signal with frequency of repetition of the pulses equal to the frequency of repetition of the pulses of the clock signal and in which the sign of the pulses of the pulse signal applied to said two-wire line varies according to the logic level of the data signal.

11 Claims, 3 Drawing Sheets

Fig_1  PRIOR ART
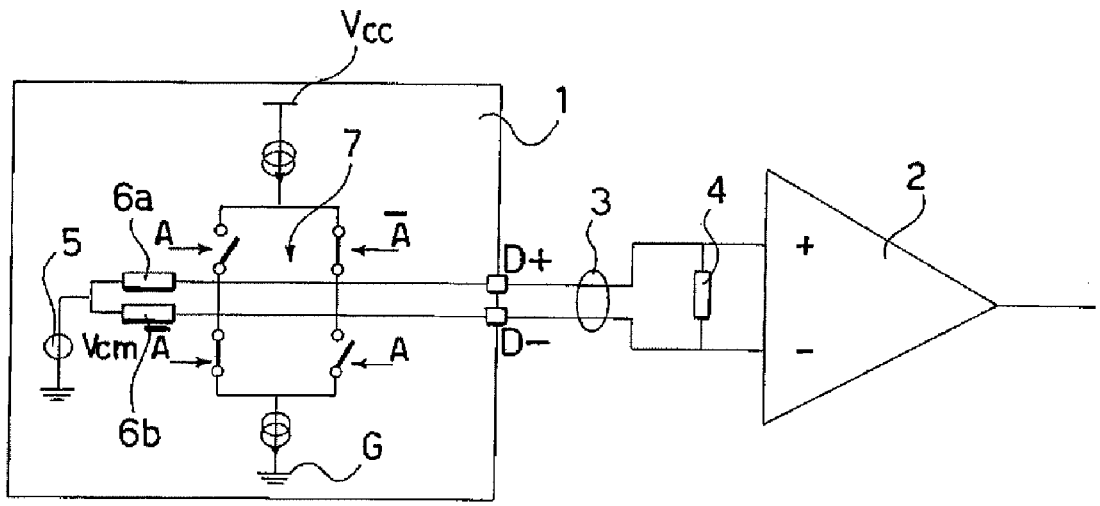
Fig_2  PRIOR ART
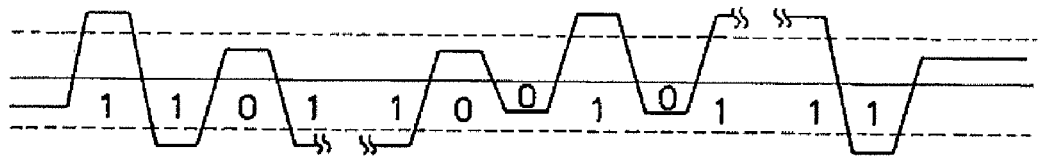
Fig_3
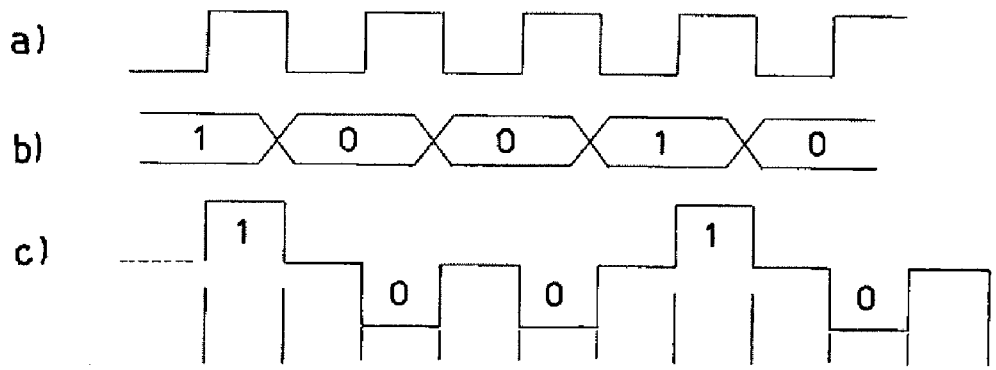

Fig_6
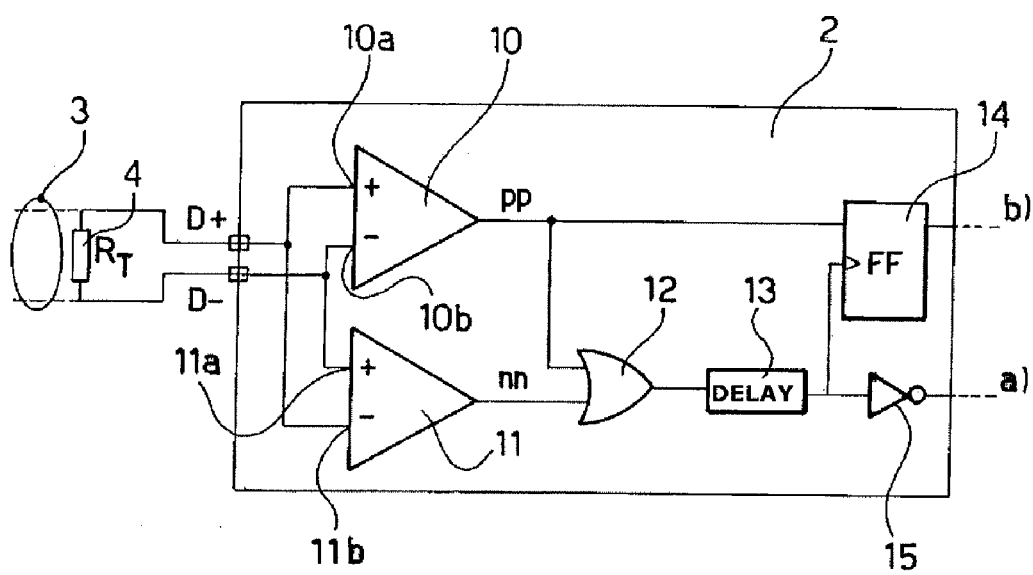
Fig_7
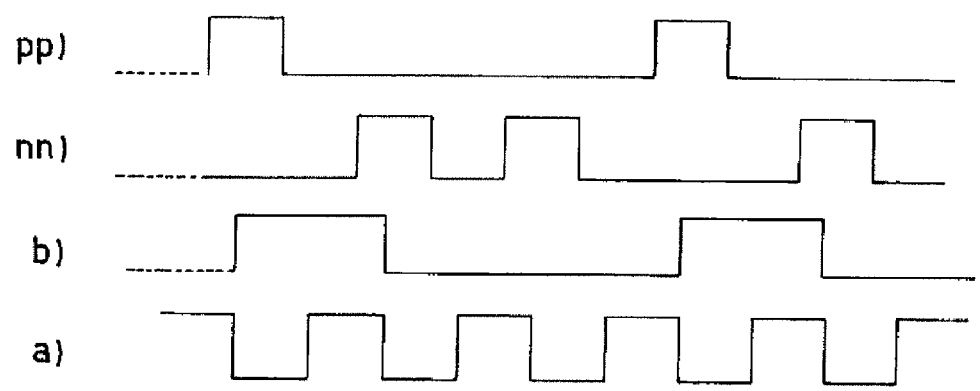

ations No. TO2007A000172 field Mar. 6, 2007, which-->Application No. TO2007A000172 field Mar. 6, 2007, which

METHOD FOR COMMUNICATING DATA AND CLOCK SIGNALS AND CORRESPONDING SIGNAL, TRANSMITTER AND RECEIVER

RELATED APPLICATION

The present application claims priority of Italian Patent Application No. TO2007A000172 field Mar. 6, 2007, which is incorporated herein in its entirety by this reference.

FIELD OF THE INVENTION

The present invention relates to techniques for communicating data and clock information. As used in this context, the term "communicating" applies both to the operation of transmitting and to the operation of receiving said information.

BACKGROUND OF THE INVENTION

The block diagram of FIG. 1 of the attached plates of drawings represents a solution (LVDS driver) that has been used for transmitting data signals and clock signals between a driving unit or driver 1 and a receiver 2 using a two-wire line 3, loaded with a resistor 4 at the input of the receiver 2.

In FIG. 1, the reference $V_{cm}$ designates the "common-mode" voltage source of the two-wire line 3, viewed as differential line, with the voltage source $V_{cm}$ that is set across the two conductors of the two-wire line 3, through two resistors 6a and 6b, usually assumed to have the same resistance value.

The reference number 7 designates collectively four switches, connected according to a general full-bridge configuration, which enable connection alternatively of one and the other of the conductors of the two-wire line 3 either to a current generator referred to a supply voltage Vcc or to a current generator referred to a ground level G. In the figure, the symbol A designates the logic signal corresponding, respectively, to opening or closing of the individual switches of the bridge 7 (A=switch open, $\overline{A}$=switch closed), with the value assumed by the symbol A that is able to express the binary value of a datum to be transmitted.

The circuit represented in FIG. 1 is able to cause a current of given intensity to circulate in the load resistor 4, the direction of said current changing as a function of the value of the data bit ("0" or "1") on the basis of the condition of opening/closing of the switches 7. According to the direction of the current, the voltage across the resistor 4 assumes a positive value (datum="1") or negative value (datum="0").

In the case where it is desired to transmit both data and a clock signal, i.e., an isochronous pulse train, the diagram of FIG. 1 requires the use of two drivers 1, one for sending the clock signal and the other for sending the data.

FIG. 2 illustrates another diagram, which has been used in MAXIM MAX9223/MAX9224 devices for sending clock signals and data signals on two conductors of a two-wire line (or differential line). Basically, the solution referred to in FIG. 2 envisages transmission of a clock signal that is, to a certain extent, modulated by the logic signal: when the voltage level falls outside the dashed lines, the signal is interpreted as having associated thereto the logic value "1". When, instead, the signal falls within the interval indicated by the dashed lines, the signal is interpreted as having associated thereto the logic value "0".

SUMMARY OF THE INVENTION

Albeit enabling a satisfactory level of operation to be achieved, the solutions previously described may undergo further improvements as regards two fundamental aspects:
 the reduction of current absorption; and
 the possibility of transmitting both a clock signal and a logic signal without having to resort to the duplication of the prior art circuit with two distinct units, designed, respectively, one for the transmission of the clock and the other for the transmission of the logic signal.

The need to have available circuits of this nature is felt in all those applications where it is desired to be able to send simultaneously, on a single two-wire connection, both a logic signal and a clock signal. In particular, this need is felt in the interfacing devices used in communications between multimedia processors and the display units of mobile telephones or else optical sensors (photo and video cameras and multimedia processors), the above combined with the possibility of reducing the amount of wires present, for example, in a mobile telephone, with improvements in terms of saving and of space, as well as of performance as regards problems electromagnetic interference.

The invention described herein has the purpose of providing a solution to said need.

According to the solution described herein, that object is achieved using a method for communicating simultaneously on a two-wire line including a clock signal constituted by pulses with given frequency of repetition, and a data signal that is able to assume two logic levels, by applying to said two-wire line a bipolar pulse signal with frequency of repetition of the pulses equal to the frequency of repetition of the pulses of said clock signal and wherein the sign of the pulses of the bipolar pulse signal applied to said two-wire line varies according to the logic level of said data signal.

The invention relates also to a corresponding signal, as well as to a corresponding transmitter circuit and a corresponding receiver circuit.

The claims form an integral part of the disclosure of the invention provided herein.

One embodiment of the solution described herein is based upon the solution of transmitting, on the aforesaid two-wire line, a clock pulse signal by associating to the pulses of said pulse signal a positive sign or else a negative sign according to the value associated to the logic signal to be transmitted; in the "inactive" portions of the clock signal, applied to the two-wire line there is, instead, a differential signal of value practically zero.

BRIEF DESCRIPTION OF THE DRAWINGS

The invention will now be described, purely by way of non-limiting example, with reference to the annexed plates of drawings, in which:

FIGS. 1 and 2 have already been described previously, according to the prior art;

FIG. 3 comprises a series of timing charts that illustrate the characteristics of a signal transmitted in the solution described herein;

FIG. 6 is a block diagram representing a receiver for signals transmitted according to the solution described herein; and FIG. 7 is made up of a number of superimposed diagrams illustrating the operation of the circuit of FIG. 6.

DETAILED DESCRIPTION OF EXEMPLARY EMBODIMENTS

FIG. 3 comprises three superimposed diagrams (considered ideally referred to a common time scale, not explicitly illustrated in the figure), which refer:

in diagram a), to a clock signal constituted basically by a square wave (or, in general, by an isochronous periodic pulse signal, i.e., with constant frequency of repetition of the pulses);

in diagram b), to a logic signal that is able to assume two logic levels ("0", "1", i.e., "low" and "high"), representing a information stream: by way of example, the sequence of the signals 10010 is illustrated; and in diagram c), to a signal that, according to the solution described herein, enables simultaneous transmission, on a two-wire line, of both the clock signal of diagram a) and the logic signal of diagram b).

The signal of diagram c) is basically a bipolar and isochronous pulse signal, i.e., with frequency of repetition of the pulses that is constant and equal to the frequency of the clock signal a) and, in which each cycle of the signal c), comprises two different portions:

in the first portion, the level of the signal c) has a given value of amplitude (for example, 150 mV in the case of a voltage signal detected between the two conductors of the line 3), with the polarity (i.e., sign) of the pulse that varies according to the logic level of the associated data signal (for example, a positive sign if the logic signal has the value "1", and a negative sign if the logic signal has the value "0", or vice versa); and in the second portion, the signal c) is configured typically as a (differential) signal with a value substantially equal to zero.

In the example illustrated here, both the signal a) and the signal c) have a duty cycle of 50%: persons skilled in the art will readily understand that the same principle is applicable to signals with a different duty cycle.

Figure 4:
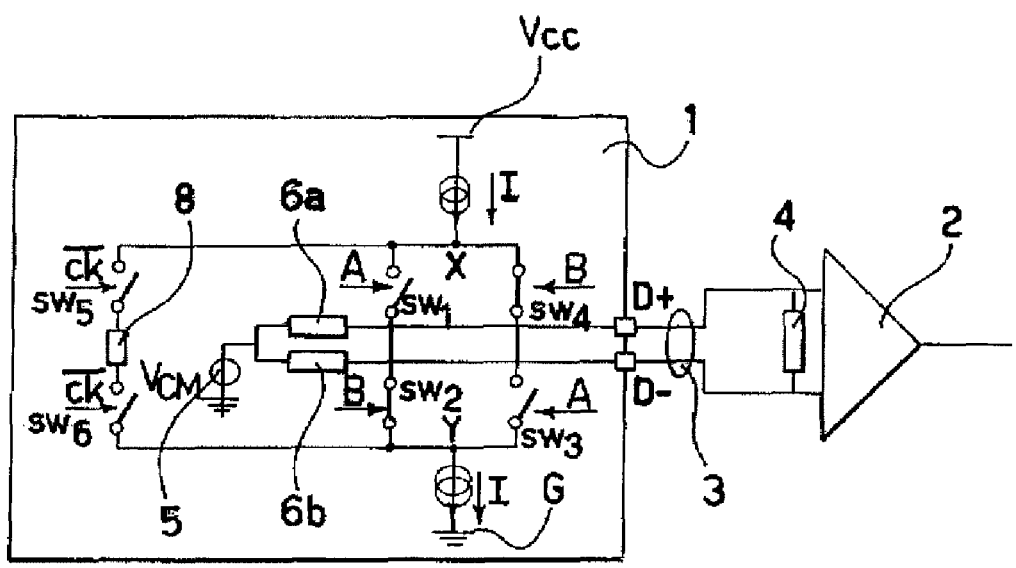
FIG. 4 is a circuit diagram exemplifying a transmitter built according to the solution described herein.

The block diagram of FIG. 4 illustrates a circuit that enables generation of a signal having the characteristics of the signal represented by diagram c) of FIG. 3.

The circuit of FIG. 4 reproduces different characteristics of the circuit of FIG. 1. Consequently, parts and elements that are identical or equivalent to the ones already described with reference to FIG. 1 have been designated in FIG. 4 with the same numerical or alphabetical references. These identical or equivalent parts and elements will hence not be described again in detail with reference to FIG. 4.

However, the switches of the full-bridge structure, designated collectively by 7 in the case of the diagram of FIG. 1, are designated in FIG. 4 distinctly as sw1, sw2, sw3, and sw4. In particular, distinguishing the two conductors of the two-wire line 3 as, respectively, "positive" conductor and "negative" conductor according to whether they correspond to the positive output terminal D+ or the negative output terminal D− of the driving unit or driver 1 (hence, without any specific connotation of the voltage level that the two conductors can reach), the arrangement of connection of the four switches in question is the following:

switch sw1, set between the supply voltage Vcc (current generator I) and the negative conductor of the two-wire line;

switch sw2, set between the negative conductor of the two-wire line 3 and the ground G (current generator I);

switch sw3, set between the positive conductor of the two-wire line 3 and the ground G (current generator I); and switch sw4, set between the supply voltage Vcc (current generator I) and the positive conductor in the two-wire line 3.

The diagram of FIG. 4 likewise comprises two further switches sw5 and sw6, set in series with respect to one another between the voltage Vcc and ground G, with the interposition of a load resistor 8.

Figure 5:
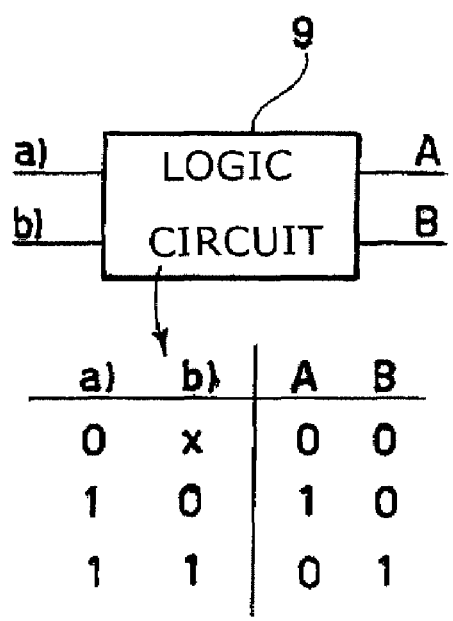
FIG. 5 illustrates the modalities of driving the circuit of FIG. 4.

The switches sw1, sw2, sw3 and sw4 are, instead, driven via two logic signals A and B (with switch closed when the respective logic signal is at level "1", and switch open when the respective logic signal is at level "0"), generated via a logic circuit 9 (FIG. 5).

The logic circuit 9 operates on the basis of the truth table represented in FIG. 5, namely:

with the signals A and B at level "0" (whatever the logic level of the datum of the signal b) of FIG. 3) when the clock is at level "0"; and with the signals A and B that have the values, respectively, of "1" and "0", or "0" and "1" according to whether, during the clock pulse (i.e., during the first portion of the signal c) of FIG. 3) the datum to be transmitted has the value "0" or "1".

The switches sw5 and sw6 receive the clock signal a) in complemented form and are hence closed when the clock signal a) is at level "0" and are, instead, open when the clock signal of the diagram of FIG. 3 is at level "1".

It is hence evident that the "two-wire" line 3 is configured as such in so far as it enables application of the signal c) as a differential signal.

In brief, the switches sw1, . . . , sw4 constitute, as in the case of FIG. 1, a full-bridge circuit that causes a current to circulate through the two-wire line 3, the direction of which changes according to the logic value of the data signal b) of the diagram of FIG. 3, hence producing on the load resistor 4 a voltage level with amplitude (magnitude) of a given value (for example, 150 mV) but with opposite sign (for example, +150 mV or −150 mV) according to the logic value of the datum b).

The aforesaid "modulation" of the sign of the pulse is performed when the clock signal (diagram a) of FIG. 3) is at a high logic level, or level "1".

When the clock signal a) is at a low logic level, or level "0", all the switches sw1, . . . sw4 are open, so that no current flows through the two-wire line 3. The voltage across the resistor 4 is hence a common-mode voltage fixed by means of the resistors 6a, 6b, and is substantially equal to 0 V.

Preferentially, the switches sw5 and sw6 are designed in such a way as to have the same resistance as the switches sw1 (or sw4) and sw3 (or sw2) respectively. Preferably, the value of the resistor 8 is chosen equal to the parallel between the value of resistance of the load resistor 4 and twice the value (assumed equal) of resistance of the resistors 6a and 6b.

This choice is aimed at preventing the d.c. voltage at the nodes designated by X and Y from changing appreciably upon change of the phase of the clock signal. This enables maintenance of a good quality of the differential output voltage, reducing the common-mode rebound effects and the undesired transient voltage spikes (glitches) during the transitions of the clock signal.

Persons skilled in the sector will appreciate that, albeit representing a preferential choice for the reason set forth previously, the circuit solution represented in FIG. 4 does not constitute the only circuit solution that can enable generation of a signal such as the signal represented by c) in FIG. 3.

The block diagram of FIG. 6 illustrates a possible circuit embodiment of a receiver 2 that is able to extract, from a signal such as the signal c) of FIG. 3 (assumed as being present across resistor 4, reproduced also in FIG. 6), the two signals, namely the clock signal a) and the data signal b) that have been combined in the signal transmitted on the two-wire line 3.

The receiver 2 of FIG. 6 comprises two comparators 10 and 11, the non-inverting inputs (10a, 11a) and inverting inputs (10b, 11b) of which are connected to the "positive" conductor and to the "negative" conductor of the two-wire line 3 in a complementary way with respect to one another, i.e., with the positive conductor connected to the non-inverting input 10a of the comparator 10 and to the inverting input 11b of the comparator 11 and, in a complementary way, the negative conductor connected to the inverting input 10b of the comparator 10 and to the non-inverting input 11a of the comparator 11.

The two comparators 10 and 11 have consequently a given relative offset, for example of 50 mV. This offset is introduced so as to acquire, as low logic level, a differential input voltage equal to 0 V of the same type as the signal transmitted in the second portion of each cycle of the signal c) of FIG. 3.

One of the comparators (e.g, comparator 10) has an output voltage with logic level "1" during the first portion of the cycle if the data bit has the logic level "1", whilst the other comparator (e.g., comparator 11), has the output level equal to "1" if the level of the data bit is equal to "0". Both of the comparators 10 and 11 have the output at "0" during the second portion of the period of the signal c) of FIG. 3.

The output signals of the comparators 10 and 11, designated, respectively, by pp and nn, are combined in an OR logic gate 12, from which (passing through a delay module 13, the function of which will be clarified in what follows) the clock signal a) in complemented form is obtained. The clock signal is then returned in its original version after passage in an inverter logic 15.

The (complemented) clock signal is used for cadencing a flip-flop 14, which receives, on its input, the output signal pp of the comparator 10 and supplies, on its output, the data signal b).

The delay element 13 is used for delaying slightly the clock signal used for cadencing the flip-flop 14 precisely to take into account the set-up time of the flip-flop 14 itself.

Also here it will be appreciated that, albeit representing the currently preferred solution, above all as regards the characteristic of refractoriness in regard to noise and the simplicity of the circuit, the circuit configuration represented in FIG. 6 is not the only one possible for performing the operation of recovery of the clock signal and of the data signal from the signal c) of FIG. 3.

Of course, without prejudice to the principle of the invention, the details of construction and the embodiments may vary, even significantly, with respect to what is described and illustrated herein purely by way of example, without thereby departing from the scope of the present invention as defined by the annexed claims.

We claim:

1. A method for communicating simultaneously on a two-wire line a clock signal constituted by pulses with given frequency of repetition and a data signal that is able to assume two logic levels, the method comprising:
   applying to said two-wire line a bipolar differential pulse signal with frequency of repetition of the pulses equal to the frequency of repetition of the pulses of said clock signal; and
   varying the sign of the pulses of the bipolar differential pulse signal applied to said two-wire line according to the logic level of said data signal.

2. The method according to claim 1, wherein each cycle of the bipolar differential pulse signal comprises:
   a first portion, in which said pulse signal has a given amplitude value, the sign of which varies according to the logic level of said data signal; and
   a second portion, in which said pulse signal has a value substantially equal to zero.

3. The method according to claim 2, wherein said first portion and said second portion have equal duration.

4. A signal applicable to a two-wire line for simultaneously communicating on said two-wire line a clock signal constituted by pulses with a given frequency of repetition, and a data signal that is able to assume two logic levels, comprising a bipolar differential pulse signal with a frequency of repetition of the pulses equal to the frequency of repetition of the pulses of said clock signal and in which the sign of the pulses of the bipolar pulse signal varies according to the logic level of said data signal.

5. The signal according to claim 4, wherein each cycle of the signal comprises:
   a first portion, in which the level of said pulse signal has a given amplitude value, with the sign that varies according to the logic level of said data signal; and
   a second portion, in which said pulse signal has a value substantially equal to zero.

6. The signal according to claim 5, wherein said first portion and said second portion have equal duration.

7. A circuit for generating a signal applicable to a two-wire line for simultaneously communicating on said two-wire line a clock signal, constituted by pulses with given frequency of repetition, and a data signal that is able to assume two logic levels comprising a generator circuit including a full-bridge circuit with, associated to the branches of said full bridge, switches that can alternatively be switched in opening and in closing by said data signal for generating pulses of a bipolar pulse signal, the sign of which varies according to the logic level of said data signal, the switches of said bridge circuit being switchable in opening by said clock signal for inhibiting generation of said pulses of said pulse signal.

8. The generator circuit according to claim 7, wherein said switches of said full-bridge circuit are alternatively switchable in opening and in closing by said data signal in a first portion of the period of the generated pulse signal, in which the level of said generated pulse signal has a given amplitude value, with a sign that varies according to the logic level of said data signal and are switchable in opening by said clock signal in a second portion of the period of the generated pulse signal, in which said generated pulse signal has a value substantially equal to zero.

9. The generator circuit according to claim 7 comprising at least one further switch, closable for keeping the signal at the input to said full-bridge circuit at a substantially fixed level during the transitions of said clock signal.

10. A circuit for receiving, from a two-wire line, a bipolar pulse signal with a frequency of repetition of the pulses representing the frequency of repetition of the pulses of a clock signal and in which the sign of the pulses of said pulse signal represents the logic level of a data signal, said receiver circuit comprising a first comparator and a second comparator, connected in a complementary way to the conductors of said two-wire line and with a given relative offset, so that the logic sum of the output signals of said comparators represents said clock signal, the output of one of said comparators being supplied to a flip-flop cadenced with said clock signal for reconstructing said data signal.

11. The circuit according to claim 10, comprising a delay element acting on the logic sum of the output signals of said comparators for the purpose of driving said flip-flop.

* * * * *